Dec. 12, 1967  R. W. HILL  3,358,098

HYDROSTATIC GAGE AND LEVEL CONTROL

Filed Jan. 4, 1965  2 Sheets-Sheet 1

*INVENTOR.*
RALPH W. HILL

BY *Head & Johnson*

ATTORNEYS

Dec. 12, 1967  R. W. HILL  3,358,098
HYDROSTATIC GAGE AND LEVEL CONTROL
Filed Jan. 4, 1965  2 Sheets-Sheet 2

INVENTOR.
RALPH W. HILL
BY *Head & Johnson*
ATTORNEYS

United States Patent Office 3,358,098
Patented Dec. 12, 1967

3,358,098
HYDROSTATIC GAGE AND LEVEL CONTROL
Ralph W. Hill, Tulsa, Okla., assignor to Major Engineering Company, Tulsa, Okla., a corporation of Oklahoma
Filed Jan. 4, 1965, Ser. No. 423,002
4 Claims. (Cl. 200—83)

This invention relates to a fluid pressure actuated control. More particularly, this invention relates to a combination hydrostatic liquid gage and level control which is adapted to complete or break an electrical circuit at predetermined high or low levels of liquids within a tank or the like.

Modern oil producing methods include the use of automized equipment in the separation, storage and transfer of accurate quantities of produced oil to the pipeline and refinery outlets. Many of these processes and metering systems are capable of complete automatic operation utilizing electrical and/or pneumaitc power supply.

Accordingly, it is an object of this invention to provide an electrical switch which will make or break an electrical circuit as desired when the liquid in a storage tank reaches a predetermined high or low level, as the case may be, utilizing the hydrostatic pressure within the tank as the force means for actuating the switch.

It is another object of this invention to provide a hydrostatic liquid level control which includes a visible indicator gage in the same instrument.

A yet further object of this invention is to provide a combined hydrostatic liquid level control and visible level gage which is adjustable to accommodate various tank heights and liquids of a given specific gravity. In further accordance with the above object, this invention will provide an instrument which can be easily calibrated according to already existing liquid level control conditions to which the instrument is connected.

A yet still further object of this invention is to provide a mechanism wherein the deflection per unit load of a spring, commonly known as spring rate, is adjustable.

Still another object of this invention is to provide an adjustable spring rate mechanism utilizing a spring beam member having an adjustable fulcrum.

These and other objects of this invention will become apparent upon further reading of the specification and claims when taken in conjunction with the following illustrations of which:

Detailed description

Figure 1:
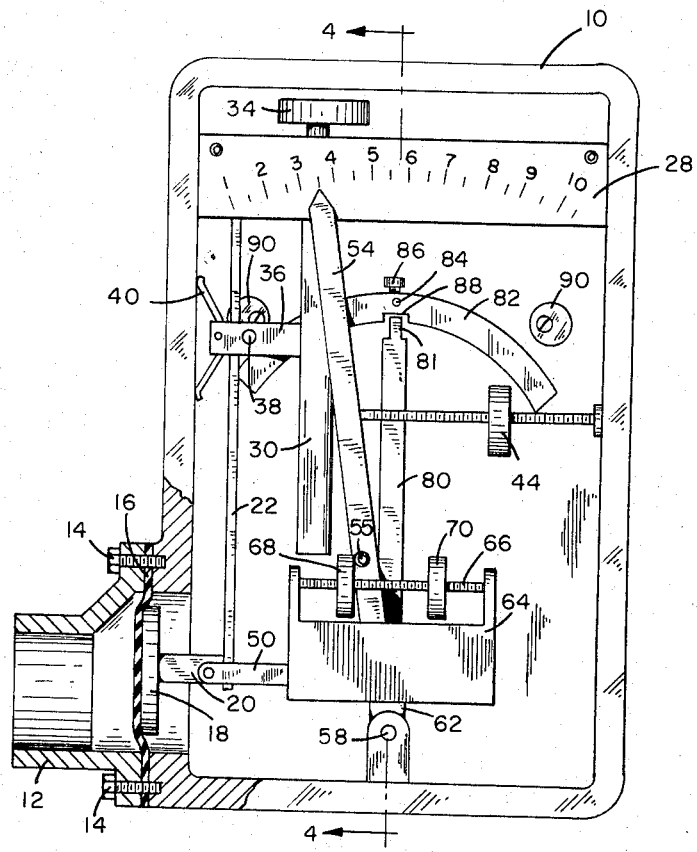
FIGURE 1 is a frontal elevational view, partly in section, depicting the apparatus of the invention in one position.
Figure 2:
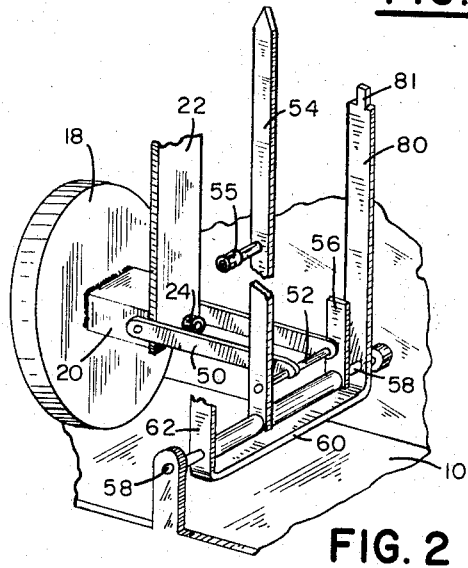
FIGURE 2 is a partial perspective view of the mechanism including a pointer arm and switch actuator as attached to the hydrostatic pressure force moving device.
Figure 3:
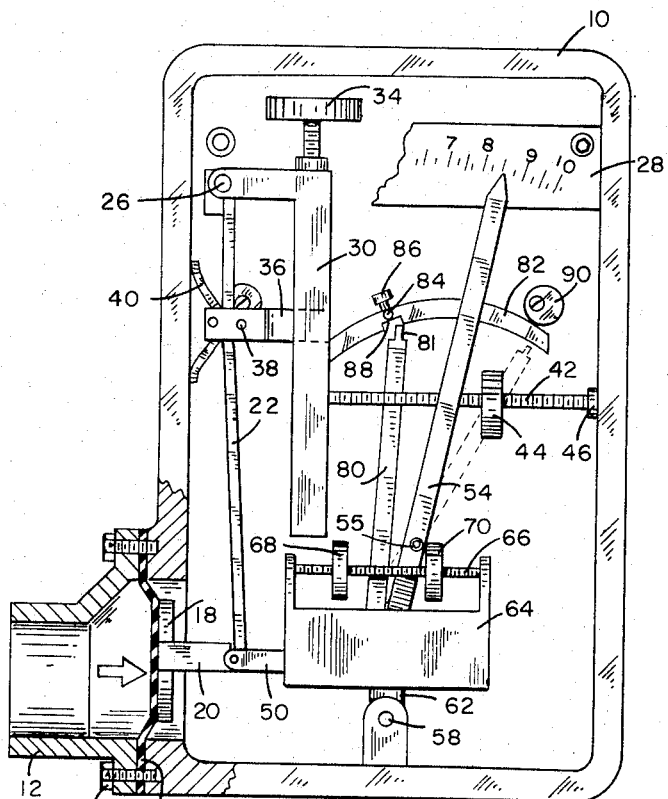
FIGURE 3 is a frontal elevational view similar to FIGURE 1 depicting the operation in another operating position.
Figure 4:
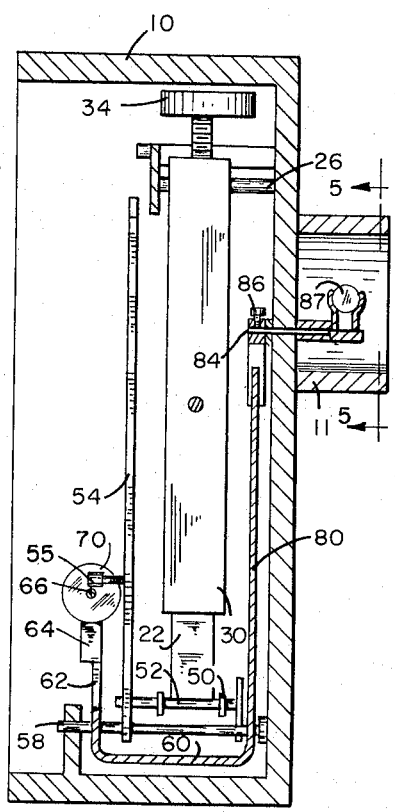
FIGURE 4 is a sectional view taken along the line 4—4 of FIGURE 1.
Figure 6:
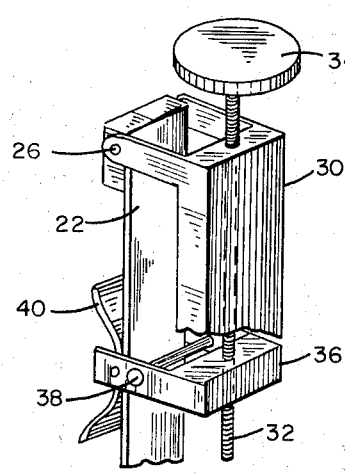
FIGURE 6 is a partial perspective view depicting the spring beam force means and adjustable fulcrum utilized in this invention.

Referring now to the drawings, this invention generally includes a housing 10 to which is attached an adaptor 12 which can be of a type well known to those skilled in the art for attachment to liquid storage tanks or the like. The adaptor is retained to housing 10 by means of fasteners 14. Between members 10 and 12 is a flexible diaphragm 16 which is adapted to move in accordance with hydrostatic pressure changes in adaptor 12. Such hydrostatic pressure force is transferred to force piston 18 which is on the housing side of diaphragm 16 and includes an extension arm 20. One end of a vertically disposed spring beam member 22 is attached to arm 20 while the other end is pivotally retained about shaft 26 which is behind gage plate 28 and is best seen in FIGURE 3, this shaft being attached or affixed to housing 10. Pivotal therewith is fulcrum support frame 30 best shown in FIGURE 6. A longitudinal threaded member 32 extends substantially vertically from top to bottom of said fulcrum support frame terminating its upper end with a hand adjustment knob 34 and adapted for rotation with respect to said frame. An adjustable fulcrum nut 36 is threadably attached to member 32 and guided for vertical movement within fulcrum support frame 30. Fulcrum support nut 36 includes fulcrum shaft 38 which provides an edge on that side of spring beam member 22 opposite force piston 18 and a leaf spring member 40 on the other side of member 22 adaptable for abutment between the beam member 22 and housing 10. A threaded shaft 42 extends substantially horizontally as shown between housing 10 and the fulcrum support frame 30 and includes an affixed control knob 44 which turns therewith such that the shaft 42 will rotate within corresponding threads in housing 10 at position 46, the operation of which is hereinafter described.

A gage pointer and switch actuator mechanism includes linkage 50 pivotally connected between extension arm 20 and a pivot pin 52 which extends between vertical pointer arm 54 and an upward extension piece 56 to assist in supporting connecting shaft 52. Both pointer arm 54 and vertical extension support arm 56 are pivotally supported about a common shaft 58 which is affixed to housing 10. A striker pin 55 extends forward from said pointer arm. Likewise pivotal abtuo shaft 58 is the switch actuating yoke 60 which includes a frontal portion 62 which terminates with a control support 64. Control support 64 includes a fixed threaded shaft 66, a first liquid level adjustment nut 68 and a second liquid level adjustment nut 70, both of which are rotatable with respect to threaded shaft 66 to predetermined positions. Rearwardly and substantially parallel thereto is vertically extending switch actuator 80 which connects to yoke member 60 to be likewise pivotal with respect to common pivot shaft 58. The upper end of switch actuator 80 is contiguous to a pivotal actuator cam 82 which is retained to a shaft 84 by a locking device 86. The pivotal switch actuating cam 82 includes a recess 88 into which the upper portion 81 of switch actuator 80 is adapted to operate such that it will first kick the pivotal switch actuating cam 82 to one side or the other depending upon direction of movement after which there is sufficient clearance to bypass the recess and continue its pivotal movement about common pivot point 58 to one side or the other as shown in dotted line in FIGURE 3. Cam lobes 90 on each side and above or adjacent the ends of pivotal switch actuating cam 82 act as stops of the total movement thereof although in some instances these are not necessary. The corresponding movement of switch actuator 80 and control support 64 and its attached yoke 60 is accomplished by abutment of a striker pin 55 which will abut against first and/or second liquid level adjustment nuts 68 or 70 depending upon the direction of movement of pointer 54.

Figure 5:
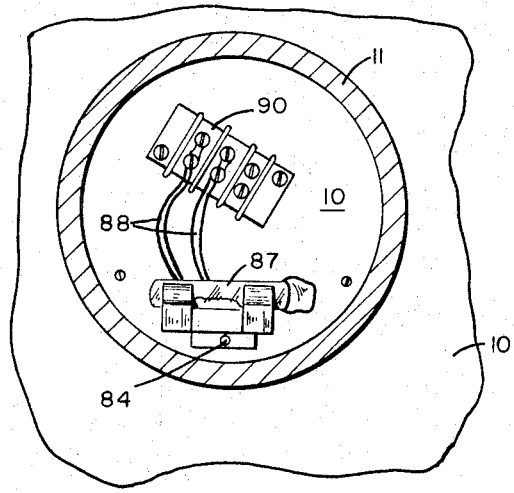
FIGURE 5 is a sectional view taken along the line 5—5 of FIGURE 4.

Rearwardly of housing 10 as described in FIGURE 5 is a connection housing 11 through which switch pivot pin 84 extends. Pivotal therewith is a mercury switch 86 from which electrical leads 88 extend to a switch terminal block 90 and from which suitable electrical circuitry may be attached as desired.

Operation

The liquid level control indicator and switch of this invention is readily adaptable for use with liquid storage tanks of various sizes and heights containing liquids of a given specific gravity. Provision is made by the various adjustments to attain full scale deflection when the tank is full of liquid and at its maximum hydrostatic liquid pressure. This is accomplished by changing the deflection per unit load of spring beam member 22 utilizing the adjustable fulcrum support. The fulcrum point of spring beam member 22 is adjustably moved upward or downward by rotation of hand control knob 34. In other words, if the deflection of pointer 54 at a given load acting against force piston 18 is desired to be increased, the fulcrum is moved upwardly with respect thereto. In some instances, suitable indicia means can be utilized upon the fulcrum support frame 30 and fulcrum nut 36 to indicate desired load conditions. For example, a suitable graduated scale used in connection with a calculated table of tank heights and specific gravities would provide a readily available means for adjusting the deflection load in accordance with the hydrostatic liquid load conditions and tank height to be encountered. Further provision is made to "zero-in" the indicator arm 54 by means of knob 44 which is affixed to threaded shaft 42, one end of which bears against fulcrum support frame and thereby pivots the frame, fulcrum nut 36 and shaft 38 against leaf spring 40, the whole system pivoting about shaft 26. Because of the interconnection of spring beam member 22, force piston 18 and linkage 50, the indicator arm 54 will move accordingly to arive at a zero starting point. This setting is made when there is no load against diaphragm 16. When the full hydrostatic liquid pressure is bearing against diaphragm 16, the vertical distance from the center of diaphragm 16 and the top of the liquid level is measured. Hand knob 34 is then adjusted until pointer 54 is aligned with the reading scale according to the heighth measured. Accordingly, since the zero liquid level above the diaphragm has been set with respect to pointer 54 and since the higher level reading has been adjusted by movement of the fulcrum shaft 38, there is now a linear relationship between the liquid level heighth and the deflection of pointer 54 in accordance with the readings upon a graduated scale 28 and hence pointer 54 will indicate the correct liquid level in the tank at all levels above diaphragm 16 regardless of specific gravity.

A low level adjustment nut 68 is adapted to be within the rotative plane of striker pin 55 on pointer 54 so as to engage therewith. Similarly so with high level adjustment nut 70. The liquid level adjustment nuts are positioned at the point desired to actuate switch 86 and pivot shaft 84. Accordingly, as the liquid within the tank rises, pointer 54 will move to the right in the diagram shown until striker pin 55 strikes the high level adjustment nut 70, which corresponding movement is transferred through control support 64, yoke 60 and switch actuator 80 to pivot switch actuating cam 82 and the attached shaft 84 and mercury switch 86 to one of either make or break an electrical circuit as desired. For example, by way of suitable electrical circuitry, a pump may be actuated to drain the liquid from the tank. The switch 86 and pivotal shaft 84 remain substantially in the condition described or tilt back to the neutral or undeflected position with no change in the make or break status of the mercury switch until the pointer begins a reverse movement as the liquid level changes, hence until it reaches that desired position of low level when striker pin 55 strikes against low level adjustment nut 68 to reverse the switch actuator 80, pivot 84 and switch 86 and hence make or break the circuit wherein the cycle is repeated.

Since many different embodiments of this invention may be made without departing from the spirit and scope of this invention, it is to be understood that the specific embodiments described in detail herein are not to be taken in a limited sense since the scope of the invention is best described by the appended claims. Hence, it is understood that as a subcombination of this application, the mechanism comprising the variable fulcrum load changing mechanism is adaptable to other control conditions where a pressure force means is available, whether it be hydrostatic, gaseous or mechanical.

Although the switch mechanism has been shown as particularly described with reference to a mercury switch, it is to be understood that other types of switches can be utilized, for example, by appropriate linkage, a snap switch or microswitch can be substituted for the mercury switch shown. In addition, it is entirely possible that, by lengthening shaft 84, additional switches can be provided to actuate different electrical circuits if so desired or perhaps utilization of other pivotal actuating cams in conjunction with switch actuator 80. A suitable cover, not shown, is adaptable over switch chamber 11. Preferably, housing 10 is provided with a front transparent cover and gasket in order that visual inspection of the interior of the instrument may be had at all times and to further keep out weathering elements.

What is claimed:

1. A hydrostatic pressure actuated liquid level control switch comprising:
   a housing having an opening therein;
   a flexible diaphragm covering said opening;
   conduit means attached to said housing at said opening to provide communication of said liquid with said diaphragm;
   an adjustable fulcrum lever system pivoted about a shaft affixed to said housing including
      (a) a vertical spring beam member one end of which pivots about said shaft, the other end of which terminates adjacent said opening with a force piston abutting said diaphragm,
      (b) a fulcrum support frame pivotally supported about said shaft and said beam member, to be substantially parallel to said beam member,
      (c) a vertical threaded shaft rotatably received by said frame,
      (d) a fulcrum nut slidably received by said frame and threadably received on said vertical threaded shaft for vertical movement upon rotation of said vertical threaded shaft, said nut including a fulcrum edge abuttable on that side of said beam member opposite said force piston, and a leaf spring on the other side of said beam member, and
      (e) a horizontally adjustable shaft moveable between said housing and said fulcrum support frame;
   a pointer arm pivotal about a second pivot shaft with respect to an indicator plate, said arm connected to said force piston for movement therewith and including a striker pin;
   a combined liquid level adjustment control support and switch actuator pivotally supported on said second shaft and independently moveable with respect to said pointer arm, said control support including adjustable level setting nuts adaptable to contact said striker pin;
   a pivotal switch actuating cam and shaft contiguous to said switch actuator, said pivotal movement in either direction limited by adjustment cam stops; and
   a mercury switch attached to and moveable with said shaft to make and break an electrical circuit.

2. A hydrostatic pressure actuated liquid level control switch comprising:
   a housing having an opening therein;
   a flexible diaphragm covering said opening;
   conduit means attached to said housing at said opening to provide communication of said liquid with said diaphragm;
   an adjustable fulcrum lever system pivoted about a shaft affixed to said housing including
      (a) a vertical spring beam member one end of which pivots about said shaft, the other end of which terminates adjacent said opening with a force piston abutting said diaphragm,
(b) a fulcrum support frame pivotally supported about said shaft and said beam member, to be substantially parallel to said beam member,
(c) a vertical threaded shaft rotatably received by said frame,
(d) a fulcrum nut slidably received by said frame and threadably received on said vertical threaded shaft for vertical movement upon rotation of said vertical threaded shaft, said nut including a fulcrum edge abuttable on that side of said beam member opposite said force piston, and a leaf spring on the other side of said beam member, and
(e) a horizontally adjustable shaft moveable between said housing and said fulcrum support frame;
a pointer arm pivotal about a second pivot shaft with respect to an indicator plate, said arm connected to said force piston for movement therewith and including a striker pin;
a combined liquid level adjustment control support and switch actuator pivotally supported on said second shaft and independently moveable with respect to said pointer arm, said control support including adjustable level setting nuts adaptable to contact said striker pin; and
a mercury switch attached to and moveable with said shaft to make and break an electrical circuit.

3. A hydrostatic pressure actuated liquid level control switch comprising:
a housing having an adjustable fulcrum lever system pivoted about a first shaft affixed to said housing including
(a) a spring beam member one end of which pivots about said shaft,
(b) a fulcrum support frame pivotally supported about said shaft and contiguous to said beam member,
(c) a fulcrum shaft slideably received by said frame and abuttable against said beam member, and
(d) means to adjustably move said shaft with respect to said beam member and thusly change its spring rate;
a pointer arm pivotally mounted on a second shaft relative to an indicator plate;
a combined liquid level adjustment control support and switch actuator pivotally supported on said second shaft and independently moveable with respect to said pointer arm, adjustable means connected with said control support to abut with said pointer arm at predetermined level positions and pivot said control support;
switch means connected with said control support actuatable upon said level positions; and
means connectable to said spring beam and said hydrostatic pressure conditions to rotate said second shaft as a function of said pressure and said spring rate.

4. Apparatus for adjusting the deflection per unit load comprising:
a housing;
a spring beam member one end of which pivots about a shaft fixed to said housing, the other end being against a load;
a fulcrum support frame pivotally supported to said housing;
a fulcrum edge slideably received by said support frame and abuttable on that side of said beam member opposite the direction of said load; and
means connected with said support frame to adjust said fulcrum shaft with respect to said beam member and thereby vary the deflection per unit load.

References Cited
UNITED STATES PATENTS
2,578,276   12/1951   Yarnall et al. _____ 200—83 X BERNARD A. GILHEANY, *Primary Examiner.*

G. MAIER, H. B. GILSON, *Assistant Examiners.*